United States Patent [19]

Mueller et al.

[11] 4,277,976

[45] Jul. 14, 1981

[54] PROCESS AND APPARATUS FOR MEASUREMENT OF NONUNIFORMITY OF MASS IN A ROTOR

[75] Inventors: Richard Mueller, Lynchburg, Va.; Guenther Himmler, Darmstadt, Fed. Rep. of Germany

[73] Assignee: Gebr. Hofmann GmbH & Co. KG, Darmstadt, Fed. Rep. of Germany

[21] Appl. No.: 54,947

[22] Filed: Jul. 6, 1979

[51] Int. Cl.³ .............................................. G01M 1/22
[52] U.S. Cl. ........................................ 73/457; 73/462
[58] Field of Search ........................... 73/66, 457, 462

[56] References Cited

FOREIGN PATENT DOCUMENTS 1623448 9/1974 Fed. Rep. of Germany ............. 73/462

Primary Examiner—James J. Gill

Attorney, Agent, or Firm—Fleit & Jacobson

[57] ABSTRACT

A process and apparatus for measurement of nonuniformity of mass of a gyro rotor having a single bearing. The gyro rotor, which is mounted in a radially fixed and spherically yielding pivot, is rotated to a predetermined speed. The static imbalance of the rotating rotor is then determined by measuring the magnitude and angular position of excursion of the rotating rotor. A force couple acting on the gyro rotor and drift of mass of the gyro rotor are determined by sensing movement of a surface of the rotating rotor at two different times. Preferably, the determination of static imbalance, force couple, and drift are obtained in a single course of measurement. After the preceding have been measured, the components of a mass balancing operation for correcting the measured nonuniformities are determined.

15 Claims, 1 Drawing Figure

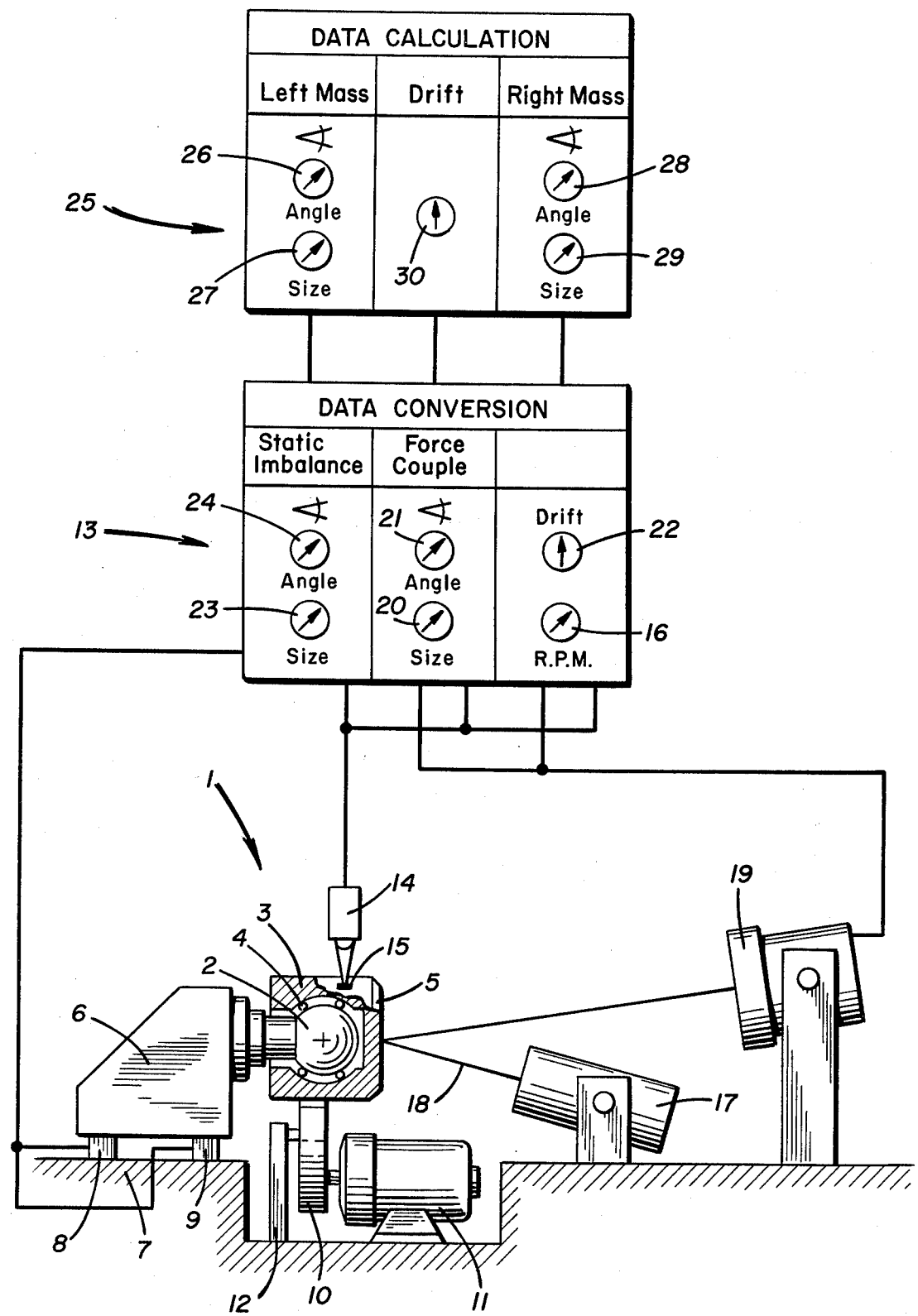

PROCESS AND APPARATUS FOR MEASUREMENT OF NONUNIFORMITY OF MASS IN A ROTOR

BRIEF SUMMARY OF THE INVENTION

The present invention concerns a process and a device for the measurement of nonuniformity of mass in a rotor, particularly a gyro rotor, which is mounted in a radially fixed but spherically yielding or hinged pivot, particularly a Cardan gimbal.

In previously known gyroscopes, a rotating body is suspended in Cardan joints and can be counterbalanced, e.g., according to German Patent No. 16 23 448.

In previously known processes, such as those using balancing machines like the KAM-100, KAM-1000 and KAM-2000 distributed by Gebr. Hofmann KG of Darmstadt, West Germany, a gyro rotor is first dynamically balanced, and then, after mounting in a gyroscope frame, the combined rotor and frame are dynamically balanced.

Recently, gyro rotors have been developed that combine the rotor and frame in one unit. The rotor used in such unit has a pivot which is so shaped that no external force couple can be applied to the pivot. Thus, counterbalancing, and in particular dynamic balancing, cannot be performed by known processes.

The problem addressed by the present invention is to devise a process and a device for balancing such gyro rotors. Specifically, the invention provides a complete mass balance using a small number of balancing positions.

According to the invention, balancing is achieved by measuring the static imbalance of a rotating rotor in a manner which itself is known, using a device which measures force or vibration according to magnitude and angular position. The force couple and the drift of the mass axis (movement of the main axis of inertia per unit time, due to gravitational force) are measured by a device which senses, i.e., scans, a reflecting surface of the rotor.

The mass axis (principal axis of inertia) of the rotor is brought to coincide with the rotating axis of the rotor, and the center of gravity of the rotor is brought to coincide with the center of gravity of the pivot, particularly of the Cardan gimbal, and these adjustments can be performed in an advantageous fashion.

According to the invention, the static imbalance, the force couple, and the drift of the mass axis determined as a function of the gravity force are all determined in a single course of measurement.

Further, with a rotor which has a reflecting rear side or end, or a rotor to the rear side or end of which a co-rotating mirror has been applied, the wobbling motion of the rotor and the drift can be optically, mechanically, or electrically sensed. When mass balance is reached, one has a rotor on which the co-rotating mirror or the reflecting rear side of the rotor rotates planarly and vibration-free.

In order to correct the mass imbalance, the mass balancing is carried out in two balancing planes, that is, the determined measurements have to be interfaced in two balancing planes. For this purpose a vector addition of the values determined for the static imbalance, the force couple, and the drift is carried out, whereby the plane components of the resulting vector are then determined.

When the imbalance is equalized, the drift often changes. Thus, the drift resulting from the equalization of imbalance is determined by calculation, and is taken into account when balancing the mass. To balance the drift or to correct the displacement of the center of gravity from the center of the pivot, in particular the center of the Cardan gimbal, it is sufficient to provide, in each of two planes, two equalizing masses located at 180° from each other at any arbitrary angular position. It is therefore possible to carry out the mass balancing in the two planes in such a way that even taking into account the matter of the drift, only three balancing steps are needed.

In this way, friction forces acting against the pivot during the operation of the rotor are defeated thereby producing a spherically yielding pivot. If desired, the mass balancing can be carried out in such a way that a predetermined static imbalance remains in the rotor.

A device for carrying out the process according to the invention comprises a radiation souce, particulaly a light source, which directs a beam, particularly a light beam, onto a reflecting rear surface of the rotor; and further comprises a detector having a receiving surface placed in the path of the beam reflected from the rear surface of the rotor. A laser is particularly suitable as the light source. Different measuring devices can be used, however.

A data conversion circuit is connected to a data receiver which determines the static imbalance. Also, the reflection detector is connected to the data conversion circuit. It is the function of this conversion circuit to analyze the data generated and to provide output data in the form of electrical signals which are proportional to the static imbalance, the force couple, and the drift. A computer circuit is connected to these outputs to calculate the balancing masses for the balancing planes.

BRIEF DESCRIPTION OF THE DRAWING

The invention is further illustrated with the aid of the accompanying FIGURE, which schematically depicts a measuring device for determining the mass distribution in a rotor which is pivoted in a spherically yielding or unconstrained mount. This device is presented as an example of an embodiment of the invention.

DETAILED DESCRIPTION OF THE INVENTION

Before discussing the illustrated device, a few comments will be made on the nature of forces acting on a rotating gyro rotor and their correction.

First, there is a static imbalance or force that results in a tendency of the rotor to translate in a given direction. This imbalance is corrected by adding weight to one side or removing weight from the other side of the gyro rotor. The weight can be added or removed either coaxially with a vertical axis extending through the center of the gyro rotor or at points equally spaced from the axis.

Second, there is a couple imbalance or force that results in a tendency of the rotor to rotate about its center. This imbalance is corrected by adding or removing two weights opposite from each other or 180° apart at two planes equally spaced from the vertical axis.

Third, there is an imbalance or force caused by gravity and resuls in a tendency of the gyro rotor to move slowly in a particular direction. The gyro rotor has a first drift, as it rotates before correction (DRIFT 1); a second subsequent drift caused by the adding or removal of weights to correct the static and couple unbalances (DRIFT 2); and a third drift which is the sum of the first and second drifts (DRIFT 3).

Correction of the preceding forces can be expressed symbolically as follows:

(1) static unbalance (s.u.): L+R;
(2) couple unbalance (c.u.): L−R;

Wherein "L" equals the weight to be added or removed from the left side of the gyro rotor, and "R" equals the weight to be added or removed from the right side of the gyro rotor.

Simultaneous solution of equations (1) and (2) provides:

(3) $L = (s.u. + c.u.) \div 2$
(4) $R = (s.u. - L) \div 2$

Also, correction of drift is governed by the formula:
(5) DRIFT 3 = DRIFT 1 + DRIFT 2, wherein DRIFT 1 is an unbalance measured during rotation of an unbalanced gyro rotor, and DRIFT 2 equals L−R.

Considering now the illustrated device, a rotor, generally designated 1, which can be a gyro rotor or gyroscope, has a single bearing or stator 2 and a rotating part 3. The rotating part 3 is rotatably pivoted on stator 2 rotating through a roller bearing 4. The pivoting is so constructed that the rotating part 3 is at the same time pivoted on stator 2 through a Cardan gimbal. A mirror 5 or reflecting surface is attached or positioned on the back side of the gyro rotor 1.

For measuring mass distribution, the stator 2 is preferably bolted directly onto a measuring table 6, although other means of attachment may be used. Preferably, the table 6 is spring-mounted on a suitable surface so that the table is not influenced by extraneous vibrations. The measuring table 6 is connected through data receivers or pickups 8 or 9 to a mounting base 7. Receivers 8 and 9 measure force excursion, such as static unbalance. The data receivers 8 and 9 are preferably quartz crystal strain gages or pressure transducers that convert changes in pressure to electrical signals. A rigid connection is preferred to the force measuring data receiver. It will be appreciated that one sensor positioned on the center of gravity could be used in place of or in addition to the sensors 8 and 9.

Gyro rotor 1 is driven to a desired rotating speed by any suitable mechanism, for instance, a belt drive 10 driven by a motor 11. The belt 10 is routed over associated rollers, not depicted in detail in the FIGURE, which rollers may be attached to a post or support 12. Since measurement is performed during deceleration of the gyro rotor 1, first the belt drive 10 is applied to the gyro rotor 1, and the gyro rotor 1 is driven up to the required rotational speed. After the rotational speed has been reached, the belt drive 10 is swung back away from the gyro rotor 1, in order to avoid the disturbing influence of the drive unit, and to enable self-alignment of the rotating part 3.

Bearing forces and vibrations of stator 2 can only arise from static imbalances, so that data receivers 8 and 9, which may be piezo elements, are connected, in parallel, between the table 6 and a data conversion circuit, generally designated 13.

The plase reference is preferably established by a photocell sensor, which is itself known, whereby during rotation, a photocell 14, comprised of a light source and a sensing unit, detects a mark 15 on the circumference of the gyro rotor 1. The mark 15 is a marking inherent to the rotor, or a chalk stripe added for sensing purposes. The photocell sensor is also used for determining the rotational speed of the gyro rotor 1, and has a readout at instrument 16 of the data conversion circuit 13. The data conversion circuit 13 is appropriately calibrated so that the static imbalance is indicated at instruments 23 and 24, in terms of magnitude and angle.

For determining the force couple, which gives rise to a wobbling motion of the rotor and, thereby, to a wobbling motion of mirror 5 mounted on the back side of the rotor, the wobbling motion being at the frequency of rotation, a beam 18 from a light source 17 (which in particular is a laser secured to the mounting base 7) is directed onto mirror 5, whereby the reflected beam is directed onto a detector 19. A suitable unit for performing this measurement is the 30A Linear Displacement Monitor distributed by United Detector Technology, Inc. of Santa Monica, Calif.

The detector is operated, in known fashion, whereby during rotation it measures deflections of the reflected beam, which deflections lie on a double cone and form a corresponding geometric locus on the surface of the detector-sensor. The detector 19 transmits the result of the sensed deflections to data conversion circuit 13. The circuit 13 also receives a corresponding phase reference from photocell sensor 14. At indicator devices 20 and 21, which in particular are calibrated as a function of the physically measurable properties of the rotor, the force couple from which the wobbling motion of the rotor results is registered in terms of magnitude and angle.

A mass asymmetry in the gyro rotor 1 which displaces the center of gravity from the center of the pivot or Cardan gimbal, causes a drift of the mirror plane as a result of the force of gravity. This drift evidences itself in that the beam reflected onto detector 19 wanders vertically upward or downward with time, depending on whether the center of mass, as viewed from the plane of the FIGURE, lies to the left or to the right of the pivot middle point or the pivot center. Thus, the drift is determined by measuring the position of the reflected light beam from light source 17 on detector 19 during free rotation of the gyro rotor 1 at two sequential time points, in a manner similar to that described in British Pat. No. 860,847 and FRG Patentschrift No. 2,012,685, so that the excursion or deflection of the light beam in this time period gives a measure of the drift which is occurring. The magnitude and direction of the vertical excursion or deflection attributable to the pivot center or Cardan gimbal center M per unit time is calibrated as a function of the gyro rotor weight, the distance between the pivot center or Cardan gimbal center M and the balancing planes of the rotor, and the rotational speed. The drift is then expressed in units of weight, e.g. grams, given as a function of the drift direction referred to the pivot center or Cardan gimbal center M. The magnitude and direction of drift is indicated on instrument 22.

The determined values, as illustrated on the instruments in data conversion circuit 13, are then preferably further transmitted to a computer circuit 25, which carries out in known fashion vector addition of the values outputted by the data conversion circuit 13, namely the values of the static imbalance, force couple, and currently occurring drift. Using formulas such as (3), (4), and (5) previously set forth, circuit 25 resolves the resulting vector into the components for the two balancing planes. In addition, there is taken into account a drift of the mass axis for each of the two balancing planes, which drift results from the balancing of the imbalance and therefore is different from the sensed drift. The determined values are displayed in terms of magnitude and direction. The drift is compensated for in a balancing plane by two balancing masses of equal magnitude, but set at 180° from each other; whereby the angular position in the given balancing plane may be selected arbitrarily. In this way, it is possible to take into account first, only one component for the drift compensation and to register the other component, if necessary, on a separate instrument 30, and to balance it at 180° from the indicated balancing angle in the given balancing plane. An angular displacement to the right on instrument 30 indicates that an additional mass balancing in the righthand plane must be carried out at 180° from the first righthand balancing point. An angular displacement to the left indicates that an additional mass balancing in the lefthand plane must be carried out at 180° from the first lefthand balancing point. The amount of angular displacement of the indicator or pointer of instrument 30 represents the magnitude of this third mass balance.

The described measuring and balancing processes is carried out employing additive mass balancing or material removal. The individual values are registered as follows: instrument 26 indicates the angle of the left balancing mass, instrument 27 indicates the magnitude of the left balancing mass, instrument 28 indicates the angle of the right balancing mass, and an instrument 29 indicates the magnitude of the right balancing mass.

The above described process is more accurately described as a polar mass balancing. However, one can also readily carry out the process according to the invention as a mass balancing of components.

The invention makes possible the simultaneous measurement of the static imbalance, the force couple, and the drift of the mass axis, as well as balancing with only three balancing points, whereby extremely small masses are removed or added resulting in extremely small adjustments. Also, correction of drift is combined with correction of either the right or left balancing mass so that one less removal operation is required to balance the gyro rotor. Thus, only three holes (weight removal) are required—a left hole, a right hole, and a second left or right hole to correct drift. It will be appreciated that a particular balancing operation might require even fewer holes.

Previously, a specific embodiment of the present invention has been described. It should be appreciated, however, that this embodiment has been described for the purposes of illustration only, without any intention of limiting the scope of the present invention. Rather, it is the intention that the present invention be limited only by the appended claims.

What is claimed is:

1. Process for measurement of nonuniformity of mass of a gyro rotor having a single bearing, the bearing being mountable in a radially fixed and spherically yielding pivot, the process comprising:
    mounting the gyro rotor in a radially fixed and spherically yielding pivot;
    rotating the rotor to a predetermined speed;
    measuring the magnitude of a force exerted on the pivot by the rotating rotor;
    sensing movement of a surface of the rotating rotor at two different times; and
    converting said measured magnitude of the force exerted on the pivot and the sensed movement of the surface of the rotating motor between said two different times to a static imbalance and drift, respectively, of the rotating rotor.

2. Process according to claim 1, wherein the static imbalance and drift are obtained in a single course of measurement.

3. Process according to any one of claims 1 or 2 wherein the force couple of the rotor is determined by sensing the motion of an end surface of the rotating rotor.

4. Process according to claim 3, further comprising the step of determining the components of a mass balancing operation for correcting the measured nonuniformity of mass, the balancing operation being carried out in two balancing planes by changing the mass of the gyro rotor, said determining of components including the steps of:
    vectorially adding the determined static imbalance and force couple to determine a first mass balancing;
    calculating a drift resulting from the first mass balancing;
    adding the calculated drift and the determined drift to determine a second mass balancing; and
    combining the first and the second mass balancings and resolving the combined balancings into vector components in the two balancing planes for the mass balancing operation.

5. A process according to claim 4, wherein the drift resulting from the first mass balancing is automatically calculated by a circuit performing vector addition and component formation.

6. A process according to claim 4, wherein the resolved vector components include two vector components for correcting drift, a first of the two vector components being added to a vector component determined by the first mass balancing, and a second of the two vector components being located 180° from the first vector component in the same plane.

7. A process according to claim 3, wherein the sensing of the end surface includes projecting a light beam onto a reflective surface of the gyro rotor, and detecting a light beam reflected from the end surface.

8. A process according to claim 4, wherein the determining of components includes providing a predetermined static imbalance in a rotor balanced to correct measured nonuniformity of mass.

9. An apparatus for measuring the nonuniformity of mass of a gyro rotor, the gyro rotor having a single bearing, the apparatus comprising:
    a radially fixed and spherically yielding pivot; means for mounting the gyro rotor in the pivot; means for rotating the mounted rotor to a predetermined rotational speed;
    first means operatively associated with the pivot for sensing the magnitude of a force exerted on the pivot by the rotating rotor;
    second means for sensing movement of a surface of the rotating rotor at two different times; and
    conversion means responsive to said first and said second means for determining the static imbalance, force couple, and drift of the gyro rotor resulting from the nonuniformity of its mass.

10. An apparatus according to claim 9, further comprising third means for sensing the rotational speed of the rotating rotor.

11. An apparatus according to any one of claims 9 or 10, wherein the gyro rotor has a reflecting end face opposite and aligned with the single bearing, and wherein said second means comprises means for projecting a radiant beam onto the reflecting end face, and means for detecting said radiant beam and for generating a signal representative of the reflection of the radiant beam from the end face.

12. An apparatus according to claim 11, wherein the radiant beam is a laser light beam.

13. An apparatus according to claim 11, further comprising:

means responsive to the conversion means for calculating drift resulting from correction of the static imbalance and force couple of the nonuniformity of mass of the gyro rotor; and means for combining the determined drift and the calculated drift to determine a required drift correction.

14. An apparatus according to claim 13, further comprising means responsive to the conversion means and the required drift correction for determining and displaying vectorial mass corrections required in two balancing planes, the mass corrections being displayed in terms of magnitude and angular position for each of the balancing planes, first and second of the vectorial mass corrections balancing the static imbalance and force couple of the gyro rotor, one of said first and second vectorial mass corrections and a third vectorial mass correction providing the required drift correction.

15. An apparatus according to claim 13, wherein said first means includes a pair of measuring transducers for sensing static imbalance during rotation of the rotor, and means for generating a signal representative of the sensed imbalance, the conversion means comprising a data conversion circuit for receiving the signal representative of the sensed static imbalance and the signal representative of the detected reflected radiant beam and processing same to determine the static imbalance, the force couple, and the drift; and a computing circuit connected to the data conversion circuit, said computing circuit determining two balancing masses in terms of magnitude and angular position for each of two balancing planes, and determining a third balancing mass located at 180° from one of the two balancing masses.

* * * * *